United States Patent [19]

Park

[11] 4,395,510
[45] Jul. 26, 1983

[54] NOVEL OLEFIN POLYMER COMPOSITIONS AND FOAMED ARTICLES PREPARED THEREFROM HAVING IMPROVED ELEVATED TEMPERATURE DIMENSIONAL STABILITY

[75] Inventor: Chung P. Park, Pickerington, Ohio

[73] Assignee: The Dow Chemical Co., Midland, Mich.

[21] Appl. No.: 422,768

[22] Filed: Sep. 24, 1982

Related U.S. Application Data

[60] Division of Ser. No. 375,606, May 6, 1982, Pat. No. 4,368,276, which is a continuation-in-part of Ser. No. 267,207, May 26, 1981, abandoned, which is a continuation-in-part of Ser. No. 154,333, May 29, 1980, abandoned.

[51] Int. Cl.³ ............................ C08K 5/20; C08J 9/14
[52] U.S. Cl. ..................... 524/230; 524/231; 524/232; 521/79; 521/94; 521/143; 521/149
[58] Field of Search .................. 524/230, 231, 232; 521/79, 94, 143, 149

[56] References Cited

U.S. PATENT DOCUMENTS

| | | | |
|---|---|---|---|
| 2,991,263 | 7/1961 | Clark et al. | 524/232 |
| 3,104,232 | 9/1963 | Clark et al. | 524/232 |
| 3,362,839 | 1/1968 | Weindel | 524/232 |
| 3,763,059 | 10/1973 | Needham et al. | 524/230 |
| 4,214,054 | 7/1980 | Watanobe et al. | 521/95 |
| 4,320,039 | 3/1982 | Morishita et al. | 524/230 |

Primary Examiner—Morton Foelak
Attorney, Agent, or Firm—James B. Guffey

[57] ABSTRACT

Elevated temperature distortion characteristics of freshly prepared olefin polymer foams are substantially improved by employing in the preparation thereof a small amount (e.g., from about 0.15 to about 10 weight percent based on the olefin polymer) of certain selected N-substituted fatty acid amide compounds of the formula:

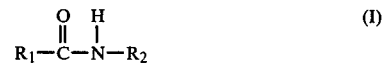

wherein $R_1$ represents an alkyl group of from 11 to 17 carbon atoms and $R_2$ represents an alkyl group of from 12 to 18 carbon atoms.

9 Claims, No Drawings

NOVEL OLEFIN POLYMER COMPOSITIONS AND FOAMED ARTICLES PREPARED THEREFROM HAVING IMPROVED ELEVATED TEMPERATURE DIMENSIONAL STABILITY

CROSS-REFERENCE TO RELATED APPLICATION

This is a divisional of application Ser. No. 375,606, filed May 6, 1982, now U.S. Pat. No. 4,368,276 which is a continuation-in-part of application Ser. No. 267,207 (filed May 26, 1981) now abandoned which was in turn a continuation-in-part of application Ser. No. 154,333 (filed May 29, 1980 and now abandoned).

BACKGROUND OF THE INVENTION

This invention relates to novel olefin polymer compositions, to a process for making foamed or expanded articles therefrom and to foams of these olefin polymer compositions which are characterized, in fresh or non-fully cured form, by improved elevated temperature distortion characteristics.

It is common practice to make closed-cell ethylenic polymer foams by an extrusion foaming process comprising the steps of heat plastifying a thermoplastic ethylenic polymer; admixing the heat plastified polymer under pressure with a volatile material such as 1,2-dichlorotetrafluoroethane and passing the resulting mixture through a die opening or shaping orifice into a zone of lower pressure to vaporize the volatile constituent and form a cellular structure which upon cooling forms the corresponding cellular solid ethylenic polymer foam. However, the development of a viable commercial extrusion foaming process—especially for relatively low density foams of lower olefin polymers—requires balancing a number of different (and sometimes competing) business and technical requirements. Accordingly, much of the extrusion foaming technology is empirical, based upon experience and directed to very specific materials and processes to produce specific commercial products.

One of the requirements for acceptable olefin polymer foam products of growing importance is the elevated temperature distortion characteristics of such products in fresh or partially cured form (i.e., the dimensional stability at elevated temperature of the foam prior to sufficient storage or aging to permit substantially complete replacement of the original blowing agent within the cellular structure of the foam with air). Such characteristic is of growing importance because (a) the elevated temperature distortion characteristics of relatively fresh olefin polymer foams are significantly dependent upon the particular ingredients (e.g., blowing agent, additives, etc.) employed in its preparation; (b) warehousing costs, storage space factors, and/or other considerations oftentimes mandate shipment of the olefin polymer foam products from the manufacturing facility prior to the time that they become fully cured; and (c) such partially cured foam products may, during transport, in enclosed vehicles particularly in warm climates or during hot weather, be subjected to prolonged exposure at relatively high temperatures. Moreover, this concern is even further aggravated by the recent trend toward the use of various stability control agents which provide improved ambient temperature dimensional stability with a wider variety of blowing agents, but which unfortunately also generally lengthen the time required for the olefin polymer foam product to reach its so-called fully cured state.

In view of the foregoing, it is an object of this invention to provide olefin polymer foams having, in fresh foam form, improved elevated temperature distortion properties as well as to provide olefin polymer compositions which are expandable to form such improved polymer foams. Another object of this invention is to provide a means to improve the dimensional stability of fresh olefin polymer foams at elevated temperatures. In addition, it is a particular object of the instant invention to provide olefin polymer foams which, in fresh foam form, have increased heat distortion temperatures and/or which, in fresh foam form, require reduced aging time at ambient temperature to reach a state at which such foam will not shrink more than five percent in volume during prolonged exposure to an elevated temperature of up to about 150° F. Other objects and advantages of the present invention will be apparent from the description thereof which follows.

SUMMARY OF THE INVENTION

The foregoing and related objectives are attained by the practice of the present invention which, in one aspect, is an olefin polymer composition comprising an olefin polymer and from about 0.15 to about 10 weight percent based upon the olefin polymer of an N-substituted fatty acid amide of the Formula

wherein $R_1$ represents an alkyl group of from about 11 to about 17 carbon atoms and $R_2$ represents an alkyl group of from about 12 to about 18 carbon atoms, said N-substituted fatty acid amide being selected from the group consisting of N-lauryl lauric acid amide, N-lauryl myristamide, N-myristyl myristamide, N-palmityl myristamide, N-lauryl palmitamide, N-myristyl palmitamide, N-palmityl palmitamide, N-palmityl stearamide and N-stearyl stearamide.

In another aspect, the present invention is the above-noted type of olefin polymer composition which further comprises a volatile organic blowing agent and which is thereby expandable to form an expanded article (i.e., a polymer foam) of said olefin polymer composition.

Finally, a particularly beneficial aspect of the present invention resides in a method for substantially improving the elevated temperature distortion characteristics (e.g., dimensional stability at elevated temperatures such as, for example, 150° F., the maximum heat distortion temperature, etc.) of relatively fresh olefin polymer foams by incorporating therein (e.g., during extrusion foaming thereof) from about 0.15 to about 10 weight percent, based upon the olefin polymer, of the above-described N-substituted fatty acid amide. Moreover, such feature is especially beneficial in view of the fact that the indicated improved elevated temperature distortion characteristics are obtained even in conjunction with relatively inexpensive volatile organic blowing agents (e.g., dichlorodifluoromethane) which otherwise are generally incapable of providing low-density olefin polymer foams having commercially acceptable elevated temperature distortion characteristics.

DETAILED DESCRIPTION OF THE INVENTION

Olefin polymers suitable for use in the practice of the present invention include homopolymers of ethylene as well as copolymers thereof with other monomers such as propylene, butene-1 and other olefins (especially α-olefins); vinyl esters of saturated carboxylic acids such as vinyl acetate, vinyl propionate, and the like; alkyl esters of monoethylenically unsaturated carboxylic acids such as methyl acrylate or methacrylate, ethyl acrylate or methacrylate, propyl acrylate or methacrylate, the several butyl and isobutyl acrylates and methacrylates, 2-ethylhexyl acrylate, dimethyl maleate and the like; the various monoethylenically unsaturated carboxylic acids themselves such as, for example, acrylic acid, methacrylic acid, etc.; and the like. Polymers of particular interest for use herein are polyethylene, ethylene-vinyl acetate copolymers and ethylene acrylic acid copolymers. Naturally, blends of 2 or more of the above-noted olefin polymers can also be suitably employed.

As has been noted, a key feature of the present invention resides in the use of a small amount of an N-substituted fatty acid amide of the Formula I as set forth above in conjunction with the above-described olefin polymers to provide olefin polymer foams having, in fresh foam form, improved distortion characteristics at elevated temperatures. A preferred group of the aforementioned N-substituted fatty acid amides for use herein includes N-palmityl stearamide, N-stearyl stearamide, N-myristyl palmitamide, N-palmityl palmitamide, N-lauryl myristamide, N-myristyl myristamide and N-palmityl myristamide. An especially preferred group of said N-substituted fatty acid amides for use herein includes N-palmityl palmitamide, N-palmityl stearamide and N-stearyl stearamide.

In addition to the above-described N-substituted fatty acid amides of the Formula I above, there may also be employed, as auxiliary stability control agents, in the practice of the present invention certain other compounds such as, for example, the higher alkyl amines, the fatty acid esters and the fatty acid amides (e.g., stearamide) different from the Formula I which are described in Watanabe et al. U.S. Pat. No. 4,214,054 (filed Oct. 19, 1978, and issued July 22, 1980) and the disclosure of which is hereby incorporated by reference. Indeed, in a preferred embodiment of the present invention, such an auxiliary stability control agent (especially stearamide) is beneficially employed in conjunction with the N-substituted compounds of Formula I in order to obtain an advantageous balance of both ambient temperature and elevated temperature dimensional stability characteristics in the olefin polymer foams prepared therewith.

In the practice of the present invention, the above-described N-substituted fatty acid amide of the Formula I is typically employed in an amount of from about 0.15 to 10 weight percent based upon the weight of the olefin polymer. When the N-substituted amide of the Formula I is used alone (i.e., without the indicated auxiliary stability control agents) it is preferably employed in an amount of from about 0.2 to about 5 (especially from about 0.7 to about 5) weight percent, but, when used in conjunction with such an auxiliary stability control agent such amide of the Formula I is preferably used in the range of from about 0.2 to about 2 (especially from about 0.4 to about 2) weight percent based upon the olefin polymer employed. Moreover, regardless of whether the N-substituted fatty acid amide of Formula I is employed alone or in combination with the above-noted auxiliary stability control additives, the total level of such additives combined will typically not be in excess of about 10 weight percent based upon the olefin polymer weight and the minimum amount of the Formula I compound employed will preferably be an amount sufficient to prevent the fresh foam prepared therewith from shrinking more than 10 percent in volume during prolonged exposure at 150° F.

The expanded olefin polymer articles of the present invention (also referred to herein as olefin polymer foams) can be conveniently prepared using conventional extrusion foaming principles by heat plastifying the desired olefin polymer resin and incorporating into such heat plastified polymer at elevated temperature and pressure (a) a volatile organic blowing agent and (b) from 0.15 to about 10 weight percent (based upon the olefin polymer) of the above-discussed N-substituted fatty acid amide of the Formula I (or a mixture of such Formula I amide with one or more of the above-noted auxiliary stability control agents) to form a flowable gel of an expandable olefin polymer composition and thereafter extruding said gel into a zone of lower pressure and temperature to form the desired substantially closed-cell olefin polymer foam.

The volatile organic blowing agent is compounded into the starting olefin polymer resin in proportions suitable to provide the desired degree of expansion in the resulting foamed cellular product, usually up to about a 60-fold volume expansion to make products having aged foam densities down to about 0.016 g/cc (about 1.0 pound per cubic foot). Depending on the starting proportion of blowing agent, the resulting foam products of this invention will typically have densities in the range of from about 0.6 to about 10 pounds per cubic foot (pcf). Preferably, the foam products of the invention are of relatively low density (e.g., in the range of from about 1 to about 6 pcf) and the practice of such invention is especially beneficial for olefin polymer foams having densities in the range of from about 1.0 to about 3 pcf. Typically, the amount of volatile organic blowing agent employed in preparing olefin polymer foams in such density ranges will be in the range of from about 0.12 to about 0.35 gram mole thereof per 100 grams of the olefin polymer employed.

The choice of the specific volatile organic blowing agent selected for use in the present invention is not particularly critical. Indeed, it is a particularly beneficial aspect of the instant invention that the use of the above-described N-substituted fatty acid amides (or their mixtures with the above-noted auxiliary stability control agents) facilitates obtainment of low density olefin polymer foams having commercially desirable properties (e.g., ambient temperature dimensional stability and/or suitable fresh foam elevated temperature distortion characteristics, etc.) with a much broader range of volatile organic blowing agent systems than was heretofore possible. Such volatile organic blowing agents can suitably be employed in the practice of the present invention either alone or in conjunction with thermally decomposable gas-releasing chemical blowing agents. Preferably, volatile organic blowing agents are employed which have an atmospheric boiling point below the melting point of the olefin polymer employed. Representative of suitable such volatile blowing agents include halogenated hydrocarbon compounds having from 1 to 4 carbon atoms (e.g., trichlorofluoromethane, dichlorodifluoromethane, dichlorofluoromethane, chlorodifluoromethane, 1,1',2-trichlorotrifluoroethane, 1,2-dichlorotetrafluoroethane, 1-chlorotrifluoroethane, 1-chloro-1,1'-difluoroethane, 1,1'-difluoroethane, octafluorodichlorobutane, etc.) as well as volatile non-halogenated hydrocarbon compounds such as propane, butane, butene, propylene, pentane, etc. Naturally, mixtures of two or more of the foregoing volatile organic blowing agents can also be suitably employed and, indeed, an especially preferred embodiment of the present invention involves the use of a mixed blowing agent system comprising from about 75 to about 90 (especially about 80) weight percent of dichlorodifluoromethane and from about 10 to about 25 (especially about 20) weight percent of trichloromonofluoromethane, both weight percentages being based upon the total weight of such mixed blowing agent system.

As has been noted, the volatile organic blowing agent is compounded into the starting olefin polymer in conventional fashion to make a flowable gel, preferably in a continuous manner, e.g., in a mixing extruder, using heat to plastify the normally solid polymer, pressure to maintain the blowing agent in non-gaseous state, and mechanical working to obtain a thorough mixing of the polymer and blowing agent. The resulting gel is then cooled if necessary and passed through a suitable die orifice into a zone of lower pressure, e.g., normal ambient air pressure, where it expands to a lower density, cellular mass. As the extruded product foams, it is taken away from the extruder, allowed to cool to harden the resulting polymer foam and collected for further processing, storage and use.

The resulting olefin polymer foam is comprised of substantially closed-cell structure and, even at low densities and when in fresh foam form, is remarkably stable in dimension at ambient temperature as well as upon exposure to elevated temperatures.

For the present purposes, the dimensional stability of the extrusion foamed products is measured by observing the changes in volume occurring in test specimens of the foam as a function of time of exposure under the environmental circumstances of concern. The test specimens are obtained by quickly cutting, from the extrusion foamed product soon, e.g., within about fifteen minutes, after emerging from the extrusion die orifice, test pieces of the desired dimensions (conveniently, samples about 6 inches long, about 1 inch thick and about 1.5 inches wide can be suitably employed) and accurately measuring their overall volume, e.g., by cubic displacement of water. The initial volume of each specimen is arbitrarily selected as the benchmark volume for the subsequent dimensional stability study.

For ambient temperature dimensional stability testing, the individual foam specimens are exposed to air at atmospheric pressure and ordinary room temperature (e.g., 70° F.) and their volumes are measured periodically to determine the minimum volume to which they shrink during the ambient temperature curing process (i.e., "curing" referring to the phenomenon in which the gaseous blowing agent within the foam cells is gradually diffusing out thereof and during which air is gradually diffusing in to replace the escaping blowing agent). For elevated temperature dimensional stability performance evaluation, the above-described ambient temperature procedures are followed except that the specimen is exposed to atmospheric pressure air at 150° F. rather than at ambient temperature. The preferred polymer foams of the present invention do not shrink by more than 10 percent from their original volume under prolonged exposure under either of such test conditions.

In addition, another method employed herein for evaluating the elevated temperature distortion characteristics of the present polymer foam products is to determine the "heat distortion temperature" thereof, which parameter as used herein represents the maximum air temperature to which the foam can be exposed for prolonged time periods prior to being fully cured (i.e., in fresh foam form shortly after being extrusion foamed) without shrinking more than 10 percent from its initial extruded volume. Under this test, the preferred foams of the present invention typically have a heat distortion temperature of at least about 150° F.

Finally, another criterion employed herein to quantify the olefin polymer foam elevated temperature distortion characteristics is referred to as "foam aging time" and refers to the minimum number of days of aging at ambient temperature (e.g., 70° F.) which is required to prevent the foam from shrinking more than 5 percent in volume upon subsequent prolonged exposure to air at a temperature of 150° F. Under this test, the preferred foams of the present invention (when in the form of specimens, about 1 inch thick, about 1.5 inches wide and about 6 inches long) typically require less than 10 days of ambient temperature aging (or curing) in order to satisfy the indicated 5 percent maximum shrinking at 150° F. criterion and for the most preferred foams of the present invention one day or less of ambient temperature aging is sufficient for such purpose.

The specific working examples that follow are intended to illustrate the invention but are not to be taken as limiting its scope. In the examples, parts and percentages are by weight unless otherwise specified or required by the context.

EXAMPLE I

In this example a series of low density polyethylene foams are made by continuous extrusion from a 1¼ inch screw-type extruder. The extrusion apparatus is equipped with additional zones for mixing and cooling following the usual sequential zones, which are usually denominated feed zone, compression and melt zone, and metering zone. The barrel is provided with conventional electric heaters for zoned temperature control and with the usual instrumentation. An inlet opening for injection of fluid blowing agent under pressure (and feed rate control therefor) is provided in the extruder barrel between the metering zone and the mixing zone. The discharge end of the extrusion apparatus is equipped with a die orifice having generally rectangular configuration (the heighth thereof being adjustable and the width being fixed at 0.25 inch).

The polyethylene employed is a low density polyethylene having a density of 0.921 g/cc and a melt index of 2.3 and is admixed, in granular form, with a small amount of talcum powder (and wetting agent) for cell size control and with the amount and type of stability control additive (if any) indicated in Table I below. The resulting mixture is then fed through a feed hopper to the extruder. Blowing agent, of the type and in the amount indicated in Table I, is pumped into the inlet between the metering and mixing zones under pressure to maintain liquid phase. The extruder zone temperatures are maintained at about 140° C. for the feeding zone, about 180° C. for the melting zone and at about 108° C. for the cooling zone immediately upstream of the die opening. The mass emerging from the die orifice to atmospheric pressure expands and forms a cellular foam which is continuously conducted away from the die as the foam forms and which cools and hardens to a strip of solid, cellular polyethylene foam having a thickness of from about 1.2 to about 1.3 inches and a width of about 1.4 inches.

Foam specimens of approximately seven inches in length (their thickness being 1.2 to 1.3 inches and their width being about 1.4 inches) are cut and their weights and volumes (i.e., by volumetric liquid displacement techniques) are determined within about five minutes after extrusion. One specimen is aged at ambient temperature (e.g., about 70° F.) and another in a refrigerator maintained at 0° C. The other specimens are aged in several convective ovens maintained, respectively, at 125° F., 150° F., 165° F. and 180° F. Weights and volumes of these specimens are periodically measured. Minimum volume as a percentage of initial volume is recorded for each sample and test condition. Heat distortion temperature of the fresh foam is determined based upon the data relating to the minimum foam volume as a function of aging temperature.

In addition, oven aging tests are periodically repeated with specimens aged for various time periods at ambient temperature. These test results are summarized in terms of foam aging time beyond which foam shrinks no more than five percent in volume during prolonged 150° F. exposure. The results of the foregoing tests are set forth in Table I below. As can be seen from such results, foams made with 0.75 to 1.5 pph stearyl stearamide and FC-12 are very stable at both ambient and elevated temperature. In contrast, foams made using stearamide in comparable amounts shrink unsatisfactorily at an elevated temperature although they are stable at ambient temperature. In addition, it should be noted that while stearyl stearamide at 0.5 pph (Test I.4) permitted more shrinkage than generally desired (more than 0.5 pph would preferably be used), it nonetheless provided more dimensional stability at 150° F. than did stearamide at the same additive level. (Compare Test I.4 with Test I.8).

Heat distortion temperature together with foam aging time represents a good indication of the relative elevated temperature performance of each stability control additive. Foams made with 0.75-1.5 pph stearyl stearamide have a higher heat distortion temperature and shorter foam aging time than those using a comparable amount of stearamide. In fact, no aging time is required for foams containing 0.75-1.5 pph stearyl stearamide. Even a marginally stable foam having 0.5 pph stearyl stearamide features a relatively short aging time in order to achieve good 150° F. dimensional stability.

Finally the results in Table I also show that the foam formulations using 0.75-1.5 pph stearyl stearamide in conjunction with dichlorodifluoroethane as the blowing agent also exhibit improved elevated temperature dimensional stability relative to comparable polyethylene foam made using the conventionally employed blowing agent, FC-114.

TABLE I

| Test No. | BA Type (1) | BA Level (2) | Stability Control Additive Type (3) | Stability Control Additive Level (4) | Foam Density (5) | Foam Thickness (6) | Foam Dimensional Stability (7) 70° F. | Foam Dimensional Stability (7) 150° F. | Heat Distortion Temperature, °F. (8) | Foam Aging Time, days (9) |
|---|---|---|---|---|---|---|---|---|---|---|
| I.1 | FC-12 | 18.2 | S-180 | 1.5 | 2.32 | 1.26 | 94 | 100 | 172 | 0 |
| I.2 | FC-12 | 17.9 | S-180 | 1.0 | 2.34 | 1.25 | 94 | 98 | 169 | 0 |
| I.3 | FC-12 | 17.5 | S-180 | 0.75 | 2.32 | 1.25 | 91 | 98 | 166 | 0 |
| I.4 | FC-12 | 17.5 | S-180 | 0.5 | 2.34 | 1.22 | 73 | 67 | 40 | 7 |
| *I.5 | FC-12 | 17.6 | S | 1.5 | 2.47 | 1.18 | 98 | 74 | 136 | 31 |
| *I.6 | FC-12 | 16.8 | S | 1.0 | 2.37 | 1.19 | 97 | 62 | 107 | 28 |
| *I.7 | FC-12 | 17.7 | S | 0.75 | 2.36 | 1.19 | 97 | 63 | 107 | 31 |
| *I.8 | FC-12 | 17.7 | S | 0.5 | 2.30 | 1.19 | 97 | 50 | 91 | 21 |
| *I.9 | FC-114 | 25.6 | — | — | 2.56 | 1.34 | 94 | 65 | 83 | 6 |

Notes:
*Not an example of this invention.
(1) = Fluorocarbon blowing agent used in the test: FC-12 = dichlorodifluoromethane, FC-114 = 1,2-dichlorotetrafluoroethane.
(2) = Parts of blowing agent mixed in per hundred parts of polymer.
(3) = Commercial grade Kemamide ® type fatty acid amides sold by Humko Chemical under the designation "S-180" and "S". In the "S-180" material the predominant component is understood to be N—octadecyl octadecanamide and in the "S" material the predominant component is understood to be octadecanamide.
(4) = Parts of the additive mixed in per hundred parts of polymer.
(5) = Density of foam body in pounds per cubic foot measured within five minutes after extrusion.
(6) = Thickness of foam body in inches measured within five minutes after extrusion.
(7) = Minimum volume of foam body as a percentage of initial volume during aging at the specified temperature.
(8) = Maximum aging temperature in degrees Farenheit at which fresh foam experiences no more than 10 percent shrinkage in volume during the aging or curing process.
(9) = Aging time at ambient temperature in days required for foam not to shrink any more than 5 percent in volume during subsequent prolonged exposure to oven temperature of 150° F.

EXAMPLE II

The apparatus used in this example is a 3½ inch screw-type extruder having essentially the same configuration as the one employed in Example I. The operating procedure of this extruder is essentially the same as the one in Example I. The die orifice employed has a rectangular cross-sectional opening, 0.09 inch high and 4 inches wide.

In the tests described below in this example there is used the same polyethylene employed in Example I. The polymeric resin in the form of common granules is fed to the extruder at an essentially uniform rate of about 400 lb/hr. Kemamide ® S-180 stearyl stearamide is fed into the extruder in the form of a concentrate. A small amount (approximately 0.3 pph) of talcum powder is also fed in with the polymer for cell size control. The extruder zone temperatures are maintained at about 120° C. at the feeding zone, 180°±20° C. at the melting and metering zones and at about 150° C. in the mixing zones. A fluorocarbon blowing agent is injected into the blowing agent injection port at a predetermined rate. The mixed mass of polymer and blowing agent is cooled down to an essentially uniform temperature of about 107° C. in the cooling zone. The mass emerging from the die orifice expands to a cellular material which is continuously conducted away from the die and which cools and hardens to form a strip of closed-cell polyethylene foam product being about 1.9 inches thick and about 10 inches wide.

Blowing agents employed in this example are FC-12, an 80/20 by weight mixture of FC-12/FC-11 or FC-114. Throughout the tests in this example, there are achieved excellent quality closed-cell foams having a uniform cell size. From the resulting extruded foam products specimens are cut to about 5.5 inches in length (width≅10 inches and heighth≅1.9 inches) in the direction of extrusion and subjected to the same testing as conducted in Example I. The results of such testing are summarized in Table II below.

As the results of Tests II.1 through II.5 indicate in Table II, stearyl stearamide at a level from one to two pph again effectively stabilizes polyethylene foams blown with F-12 or F-12/F-11 mixed expanding agent not only at ambient temperature but also at an elevated temperature. As noted from the results of Test II.6, the polyethylene foam expanded with conventionally employed FC-114 shrinks excessively at 150° F. In addition, it is seen that this latter foam product has a heat distortion temperature of only 70° F. and requires almost a month of aging before shrinking less than 5 percent in volume upon prolonged 150° F. exposure.

EXAMPLE III

In the tests of this example the polymer and extrusion apparatus of Example I is used and FC-12 is employed as the blowing agent. Blends of stearyl stearamide and stearamide mixed in various ratios are employed as a stability control additive in this example. The experimental procedure, operating conditions and product test procedures are essentially the same as in Example I.

As shown in Table III (where the test data are arranged in the general order of total additive level), the effect of stearyl stearamide on high temperature foam stability is evident. Heat distortion temperature increases and foam aging time decreases with the increasing total additive level and also with increasing stearyl stearamide level.

There are additional benefits with stearyl stearamide/stearamide blends. The blends are more effective than stearyl stearamide or stearamide alone for foam stabilization especially at low concentration. For example, a 50/50 mixture of stearyl stearamide and stearamide at 0.5 pph level (Test III.11) betters stearyl stearamide in room temperature stability (Test I.4) and stearamide in heat distortion temperature and foam aging time (Test I.8).

When the amount of stearyl stearamide added is too low as in test III.12, neither the benefit of stearyl stearamide nor its blend with stearamide is attained. Note that the stearyl stearamide level in Test III.12 is less than 0.15 parts per hundred parts of resin.

TABLE II

| Test No. | BA Type (1) | BA Level (2) | Stability Control Additive Type (3) | Stability Control Additive Level (4) | Foam Density (5) | Foam Thickness (6) | Foam Dimensional Stability (7) 70° F. | Foam Dimensional Stability (7) 150° F. | Heat Distortion Temperature, °F. (8) | Foam Aging Time, days (9) |
|---|---|---|---|---|---|---|---|---|---|---|
| II.1 | FC-12 | 12.5 | S-180 | 1.0 | 2.45 | 1.92 | 92 | 91 | 157 | 1 |
| II.2 | FC-12 | 12.6 | S-180 | 1.5 | 2.54 | 1.88 | 94 | 96 | 174 | 0 |
| II.3 | FC-12/FC-11:80/20 | 13.6 | S-180 | 1.0 | 2.61 | 1.86 | 94 | 94 | 163 | 0 |
| II.4 | FC-12/FC-11:80/20 | 13.6 | S-180 | 1.5 | 2.55 | 1.88 | 92 | 95 | 171 | 0 |
| II.5 | FC-12/FC-11:80/20 | 13.6 | S-180 | 2.0 | 2.54 | 1.88 | 95 | 97 | 177 | 0 |
| II.6* | FC-114 | 19.2 | — | — | 2.37 | 2.02 | 90 | 62 | 70 | 28 |

*Not an example of this invention.
(1) FC-12 = dichlorodifluoromethane; FC-11 = trichloromonofluoromethane; and FC-114 = 1,2-dichlorotetraflroroethane. FC-12/FC-11:80/20 indicates a 80/20 by weight mixture of FC-12 and FC-11.
(2) through (9) = The same as in Table I.

TABLE III

| Test No. | BA Type (1) | BA Level (2) | Stability Control Additive Type (3) | Stability Control Additive Level (4) | Foam Density (5) | Foam Thickness (6) | Foam Dimensional Stability (7) 70° F. | Foam Dimensional Stability (7) 150° F. | Heat Distortion Temperature, °F. (8) | Foam Aging Time, days (9) |
|---|---|---|---|---|---|---|---|---|---|---|
| III.1 | FC-12 | 17.3 | 75/25 | 1.5 | 2.23 | 1.17 | 97 | 99 | 174 | 0 |
| III.2 | FC-12 | 17.4 | 50/50 | 1.5 | 2.16 | 1.25 | 98 | 97 | 168 | 0 |
| III.3 | FC-12 | 17.2 | 25/75 | 1.5 | 2.16 | 1.14 | 97 | 92 | 154 | 1 |
| III.4 | FC-12 | 17.6 | 75/25 | 1.0 | 2.23 | 1.14 | 98 | 99 | 163 | 0 |
| III.5 | FC-12 | 17.2 | 50/50 | 1.0 | 2.19 | 1.12 | 99 | 99 | 163 | 0 |
| III.6 | FC-12 | 16.2 | 25/75 | 1.0 | 2.13 | 1.12 | 96 | 88 | 147 | 17 |
| III.7 | FC-12 | 17.4 | 75/25 | 0.75 | 2.24 | 1.14 | 97 | 96 | 158 | 0 |
| III.8 | FC-12 | 17.6 | 50/50 | 0.75 | 2.20 | 1.14 | 98 | 94 | 156 | 9 |
| III.9 | FC-12 | 17.3 | 25/75 | 0.75 | 2.18 | 1.23 | 98 | 65 | 131 | 28 |
| III.10 | FC-12 | 17.5 | 75/25 | 0.5 | 2.33 | 1.13 | 94 | 69 | 112 | 7 |
| III.11 | FC-12 | 17.3 | 50/50 | 0.5 | 2.22 | 1.13 | 98 | 67 | 138 | 13 |
| III.12* | FC-12 | 17.6 | 25/75 | 0.5 | 2.13 | 1.13 | 98 | 48 | 107 | 37 |

*Not an example of this invention.
(1) through (2), (4) through (9) = The same as in Table I.
(3) Mixture of Kemamide® S-180 stearyl stearamide and Kemamide® S stearamide, respectively in the given weight ratio.

EXAMPLE IV

In the tests of this example, the extrusion apparatus, operating conditions and experimental procedures of Example I are repeated using a low density polyethylene resin (i.e., Resin A, having a melt index of 2.3 and a density of 0.923 g/cc and Resin B having a melt index of 2.3 and a density of 0.921 g/cc) and the stability control additives which are indicated in Table IV, below.

As can be seen from the results summarized in Table IV, the use of stability control additives within the scope of the present invention (i.e., Tests IV.1-IV.3) provide substantially better 150° F. dimensional stability than do those outside the scope of the present invention (i.e., Tests IV.4-IV.12).

about 0.8 to about 1.2 inches thick and have a density of from about 1.9 to 2.4 pounds per cubic foot.

As can be seen from the results summarized in Table V, the use of N-substituted saturated fatty acid amides (a) which are of the Formula I:

wherein $R_1$ represents an alkyl group of from 11 to 17 carbon atoms and wherein $R_2$ represents an alkyl group of from 12 to 18 carbon atoms and (b) which are selected from the group consisting of N-lauryl lauric acid amide ($R_2=C_{12}$ alkyl and $R_1=C_{11}$ alkyl), N-lauryl

TABLE IV

| Test No. | Resin | Control Blowing Agent Type (1) | Blowing Agent Level (2) | Stability Additive Type (3) | Level (4) | Foam Density (5) | Foam Thickness (6) | Foam Dimensional Stability (7) 70° F. | Foam Dimensional Stability (7) 150° F. |
|---|---|---|---|---|---|---|---|---|---|
| IV.1 | A | FC-12 | 15.7 | $C_{17}H_{35}$—C(O)—$NHC_{18}H_{37}$ | 1.5 | 2.23 | 1.11 | 98 | 86 |
| IV.2 | A | FC-12 | 17.6 | $C_{17}H_{35}$—C(O)—$NHC_{16}H_{33}$ | 1.5 | 2.10 | 1.14 | 98 | 99 |
| IV.3 | A | FC-12 | 17.5 | $C_{15}H_{31}$—C(O)—$NHC_{16}H_{33}$ | 1.5 | 2.16 | 1.10 | 95 | 100 |
| IV.4* | A | FC-12 | 16.0 | $C_{15}H_{31}$—C(O)—$NHC_{18}H_{37}$ | 1.5 | 2.18 | 1.13 | 92 | 65 |
| IV.5* | A | FC-12 | 15.4 | $C_{13}H_{27}$—C(O)—$NHC_{18}H_{37}$ | 1.5 | 2.22 | 1.20 | 83 | 53 |
| IV.6* | A | FC-12 | 16.0 | $C_{11}H_{23}$—C(O)—$NHC_{18}H_{37}$ | 1.5 | 2.18 | 1.13 | 92 | 65 |
| IV.7* | A | FC-12 | 16.4 | $C_{21}H_{43}$—C(O)—$NHC_{18}H_{37}$ | 1.5 | 2.22 | 0.95 | 83 | 72 |
| IV.8* | A | FC-12 | 16.4 | $C_{17}H_{35}$—C(O)—$N(C_{18}H_{37})_2$ | 2.0 | 2.19 | 0.95 | 95 | 45 |
| IV.9* | B | FC-12 | 18.0 | $C_{21}H_{43}$—C(O)—$NH_2$ | 1.0 | 2.20 | 1.02 | 95 | 77 |
| IV.10* | B | FC-12 | 17.8 | $C_{21}H_{43}$—C(O)—$NH_2$ | 2.0 | 2.14 | 0.98 | 98 | 73 |
| IV.11* | B | FC-12 | 17.1 | $C_{11}H_{23}$—C(O)—$NH_2$ | 1.0 | 1.90 | 0.99 | 71 | 44 |
| IV.12* | B | FC-12 | 17.0 | $C_{18}H_{37}NH_2$ | 1.0 | 2.01 | 1.05 | 83 | 55 |
| IB.13* | A | FC-12 | 16.7 | None | — | 2.12 | 0.93 | 76 | — |

NOTES:
*Not an example of this invention.
(1) Blowing Agent FC-12 = dichlorodifluoromethane;
(2) Parts of blowing agent used per hundred parts of polymer.
(3) Formula given represents predominant component (e.g., about 90 weight percent or more) of the additive employed. However, inasmuch as such additives are derived from fatty acid feedstock which is not fully purified it will be recognized that similar fatty acid amides (or amines in the case of Test No. IV.12) having acyl or amine substituent carbon atom contents somewhat different from those specified in Table IV are also present in minor proportions in the additive portions employed.
(4)-(7) - The same as specified in Table I.

EXAMPLE V

In the tests of this example, the extrusion apparatus, operating conditions and experimental procedures of Example I are again repeated using a low density polyethylene resin having a melt index of 2.3 and a density of 0.923 g/cc and using the various N-substituted saturated fatty acid amide additives indicated in Table V, below. The blowing agent employed in conducting the various test runs of this example is dichlorodifluoromethane (FC-12) and is employed at a level of from 16 to 18 parts by weight per 100 parts by weight of the polyethylene resin. The various foam samples which are prepared in accordance with this example are from myristamide ($R_2=C_{12}$ alkyl and $R_1=C_{13}$ alkyl), N-myristyl myristamide ($R_2=C_{14}$ alkyl and $R_1=C_{13}$ alkyl), N-palmityl myristamide ($R_2=C_{16}$ alkyl and $R_1=C_{13}$ alkyl), N-lauryl palmitamide ($R_2=C_{12}$ alkyl and $R_1=C_{15}$ alkyl), N-myristyl palmitamide ($R_2=C_{14}$ alkyl and $R_1=C_{15}$ alkyl), N-palmityl palmitamide ($R_2=C_{16}$ alkyl and $R_1=C_{15}$ alkyl), N-palmityl stearamide ($R_2=C_{16}$ alkyl and $R_1=C_{17}$ alkyl) and N-stearyl stearamide ($R_2=C_{18}$ alkyl and $R_1=C_{17}$ alkyl) facilitates the obtention of substantially better 150° F. dimensional stability than does the use of other N-substituted saturated amide compounds which are outside the scope of the presently claimed invention.

TABLE V

150° F. Foam Dimensional Stability As a Function of Additive Level

| Test No. | N—Substituted Fatty Acid Amide Additive** | Additive Level = 2.0 parts/100 parts resin | Additive Level = 1.5 parts/100 parts resin | Additive Level = 1.0 part/100 parts resin | Additive Level = 0.5 part/100 parts resin |
|---|---|---|---|---|---|
| V.1 | $C_{17}H_{35}$—C(O)—$NHC_{18}H_{37}$ | 97 | 107 | 90 | 75 |
| V.2 | $C_{17}H_{35}$—C(O)—$NHC_{16}H_{33}$ | 103 | 102 | 101 | 58 |
| V.3* | $C_{17}H_{35}$—C(O)—$NHC_{14}H_{29}$ | 83 | 78 | 82 | 69 |
| V.4* | $C_{17}H_{35}$—C(O)—$NHC_{12}H_{25}$ | 71 | 62 | 55 | 54 |
| V.5* | $C_{17}H_{35}$—C(O)—$NHC_{20}H_{41}$ | 74 | 79 | 72 | 57 |
| V.6 | $C_{15}H_{31}$—C(O)—$NHC_{16}H_{33}$ | 103 | 103 | 101 | 60 |
| V.7 | $C_{15}H_{31}$—C(O)—$NHC_{14}H_{29}$ | 97 | 95 | 95 | 73 |
| V.8 | $C_{15}H_{31}$—C(O)—$NHC_{12}H_{25}$ | 93 | 87 | 84 | 64 |
| V.9* | $C_{15}H_{31}$—C(O)—$NHC_{18}H_{37}$ | — | 65 | 64 | 53 |
| V.10* | $C_{15}H_{31}$—C(O)—$NHC_{20}H_{41}$ | 69 | 66 | 62 | 60 |
| V.11 | $C_{13}H_{27}$—C(O)—$NHC_{16}H_{33}$ | 95 | 96 | 77 | 75 |

TABLE V-continued

| Test No. | N—Substituted Fatty Acid Amide Additive** | Additive Level = 2.0 parts/100 parts resin | Additive Level = 1.5 parts/100 parts resin | Additive Level = 1.0 part/100 parts resin | Additive Level = 0.5 part/100 parts resin |
|---|---|---|---|---|---|
| V.12 | $C_{13}H_{27}$—C(O)—$NHC_{14}H_{29}$ | 97 | 96 | 94 | 57 |
| V.13 | $C_{13}H_{27}$—C(O)—$NHC_{12}H_{25}$ | 96 | 97 | 91 | 63 |
| V.14* | $C_{13}H_{27}$—C(O)—$NHC_{18}H_{37}$ | — | 53 | 49 | 55 |
| V.15* | $C_{13}H_{27}$—C(O)—$NHC_{20}H_{41}$ | 83 | 79 | 63 | 67 |
| V.16 | $C_{11}H_{23}$—C(O)—$NHC_{12}H_{25}$ | 90 | 68 | 54 | 53 |
| V.17* | $C_{11}H_{23}$—C(O)—$NHC_{14}H_{29}$ | 80 | 73 | 69 | 71 |
| V.18* | $C_{11}H_{23}$—C(O)—$NHC_{16}H_{33}$ | 51 | 52 | 58 | 58 |
| V.19* | $C_{11}H_{23}$—C(O)—$NHC_{18}H_{37}$ | — | 49 | 51 | 52 |
| V.20* | $C_{11}H_{23}$—C(O)—$NHC_{20}H_{41}$ | 76 | 70 | 86 | 75 |
| V.21* | $C_{19}H_{39}$—C(O)—$NHC_{12}H_{25}$ | 59 | 59 | 58 | 56 |
| V.22* | $C_{19}H_{39}$—C(O)—$NHC_{14}H_{29}$ | 56 | 56 | 56 | 57 |
| V.23* | $C_{19}H_{39}$—C(O)—$NHC_{16}H_{33}$ | 77 | 83 | 77 | 56 |
| V.24* | $C_{19}H_{39}$—C(O)—$NHC_{18}H_{37}$ | — | 72 | 69 | 61 |
| V.25* | $C_{19}H_{39}$—C(O)—$NHC_{20}H_{41}$ | 86 | 87 | 77 | 52 |

*Not an example of the present invention.
**Formula given generally represents predominant component (e.g., from about 80 to 90 weight percent or more) of the additive employed. However, inasmuch as such additives are derived from fatty acid feedstock which is not fully purified, it will be recognized that similar fatty acid amides having acyl or amine substituent carbon atom contents somewhat different from those specified in Table V are also present in minor proportions in the additive portions employed. In the specific case of the additive compounds in which the acyl and/or amine substituent is indicated as containing 20 carbon atoms, it should be understood that such substituents are predominantly composed (e.g., 80 to 90 percent by weight) of an approximately equal weight mixture of $C_{20}$ and $C_{22}$ components.

While the present invention has been described and illustrated herein by reference to certain specific examples and embodiments thereof, such fact is not to be taken as in any way limiting the scope of the instantly claimed invention.

What is claimed is:

1. An olefin polymer composition consisting essentially of an olefin polymer and from about 0.15 to about 10 weight percent based upon the weight of said olefin polymer of an N-substituted fatty acid amide of the Formula:

wherein $R_1$ represents an alkyl group of from about 11 to about 17 carbon atoms and $R_2$ represents an alkyl group of from about 12 to about 18 carbon atoms, said N-substituted fatty acid amide being selected from the group consisting of N-lauryl lauric acid amide, N-lauryl myristamide, N-myristyl myristamide, N-palmityl myristamide, N-lauryl palmitamide, N-myristyl palmitamide, N-palmityl palmitamide, N-palmityl stearamide and N-stearyl stearamide; said N-substituted fatty acid amide being employed in an amount such that if said olefin polymer composition is foamed by extrusion using a volatile organic blowing agent, the presence of said fatty acid amide prevents the freshly prepared foam from shrinking by more than 10% from its initially foamed volume when subjected to prolonged exposure to atmospheric pressure air at 150° F.

2. The olefin polymer composition of claim 1 wherein the olefin polymer is polyethylene, an ethylene-vinyl acetate copolymer or an ethylene-acrylic acid copolymer.

3. The olefin polymer composition of claim 1 wherein the N-substituted fatty acid amide is N-stearyl stearamide, N-palmityl stearamide or N-palmityl palmitamide.

4. The olefin polymer composition of claim 1 wherein the N-substituted fatty acid amide is selected from the group consisting of N-lauryl myristamide, N-myristyl myristamide, N-palmityl myristamide, N-myristyl palmitamide, N-palmityl palmitamide, N-palmityl stearamide and N-stearyl stearamide.

5. The olefin polymer composition of claim 1 wherein the N-substituted fatty acid amide is employed in an amount sufficient to prevent a freshly prepared foam made from such composition using a volatile organic blowing agent from shrinking by more than 10 percent from its initial foamed volume when subjected to prolonged exposure to atmospheric pressure air at 150° F.

6. The olefin polymer composition of claim 1 which further comprises an auxiliary stability control agent selected from the group consisting of (a) higher alkyl amines, (b) fatty acid esters and (c) fatty acid amides different from those of Formula I above and wherein the combined weight of such auxiliary stability control agent and the Formula I compound is no more than about 10 weight percent based upon the weight of the olefin polymer.

7. The olefin polymer composition of claim 6 wherein the auxiliary stability control agent is stearamide.

8. The olefin polymer composition of claim 7 wherein the N-substituted fatty acid amide is employed in an amount ranging from about 0.2 to about 2 weight percent based upon the weight of the olefin polymer.

9. The olefin polymer composition of claim 1 wherein the N-substituted fatty acid amide is employed in an amount of from about 0.7 to about 5 weight percent based upon the olefin polymer.

* * * * *